(12) United States Patent  (10) Patent No.: US 8,554,734 B1
Chatterjee et al.  (45) Date of Patent: Oct. 8, 2013

(54) CONTINUOUS DATA PROTECTION JOURNALING IN DATA STORAGE SYSTEMS

(75) Inventors: Paresh Chatterjee, Fremont, CA (US); Narayanan Balakrishnan, Milpitas, CA (US); Raja Jayaraman, Fremont, CA (US); Narayanaswami Ganapathy, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 823 days.

(21) Appl. No.: 12/173,188

(22) Filed: Jul. 15, 2008

Related U.S. Application Data

(60) Provisional application No. 60/950,651, filed on Jul. 19, 2007, provisional application No. 60/950,660, filed on Jul. 19, 2007.

(51) Int. Cl.
*G06F 7/00* (2006.01)
*G06F 17/00* (2006.01)

(52) U.S. Cl.
USPC .......................................... 707/640; 707/674

(58) Field of Classification Search
USPC .................. 707/640, 648–649, 674, 672, 685
See application file for complete search history.

(56) References Cited

U.S. PATENT DOCUMENTS

| | | | |
|---|---|---|---|
| 4,942,579 A | 7/1990 | Goodlander et al. | |
| 5,257,367 A | 10/1993 | Goodlander et al. | |
| 5,530,850 A | 6/1996 | Ford et al. | |
| 5,720,027 A | 2/1998 | Sarkozy et al. | |
| 5,732,238 A | 3/1998 | Sarkozy | |
| 5,790,774 A | 8/1998 | Sarkozy | |
| 5,893,919 A | 4/1999 | Sarkozy et al. | |
| 5,974,426 A | 10/1999 | Lee et al. | |
| 6,098,128 A | 8/2000 | Velez-McCaskey et al. | |
| 6,298,425 B1 | 10/2001 | Whitaker et al. | |
| 6,434,681 B1 | 8/2002 | Armangau | |
| 6,460,054 B1 | 10/2002 | Grummon | |
| 6,892,211 B2 | 5/2005 | Hitz et al. | |
| 7,072,916 B1 | 7/2006 | Lewis et al. | |
| 7,111,026 B2 | 9/2006 | Sato | |
| 7,225,210 B2 * | 5/2007 | Guthrie, II. | 1/1 |

(Continued)

OTHER PUBLICATIONS

U.S. Appl. No. 12/425,123, filed Apr. 16, 2009 entitled "Provisioning Space in a Data Storage System", Inventors: Chatterjee et al.

(Continued)

*Primary Examiner* — Robert Beausoliel, Jr.
*Assistant Examiner* — Susan F Rayyan
(74) *Attorney, Agent, or Firm* — Meunier Carlin & Curfman, LLC (57) ABSTRACT

Technologies for providing block-level continuous data protection can operate without additional external devices. I/O operations to a storage volume may be logged to a sequential journal volume. The logging can occur in parallel to the I/O operation thereby having little, or no, impact on the performance of the storage system. Previous data need not be backed up; instead only new I/O operations may be recorded in the journal or log. Snapshot events may also be recorded to the logging journal. When a volume is to be recovered, a snapshot can be mounted and I/O operations after the snapshot creation, but prior to the recovery point, can be played back onto the snapshot. Operators may be provided with a flexible mechanism for reviewing and recovering data after a data loss. Using snapshots and I/O journals, a volume can be rolled back to a desired point nearly instantaneously.

20 Claims, 6 Drawing Sheets

(56) References Cited

U.S. PATENT DOCUMENTS

| | | | |
|---|---|---|---|
| 7,373,366 | B1 | 5/2008 | Chatterjee et al. |
| 7,536,529 | B1 | 5/2009 | Chatterjee et al. |
| 7,549,027 | B1 * | 6/2009 | McAndrews et al. ......... 711/161 |
| 7,651,593 | B2 * | 1/2010 | Prahlad et al. ................ 202/204 |
| 7,689,597 | B1 | 3/2010 | Bingham et al. |
| 7,698,503 | B2 * | 4/2010 | Okada et al. .................. 711/115 |
| 7,725,667 | B2 | 5/2010 | Rowan et al. |
| 7,822,827 | B2 | 10/2010 | van Rietschote et al. |
| 7,885,938 | B1 | 2/2011 | Greene et al. |
| 7,890,461 | B2 * | 2/2011 | Oeda et al. .................... 707/614 |
| 7,904,428 | B2 * | 3/2011 | Perry et al. .................... 707/677 |
| 7,930,275 | B2 * | 4/2011 | Chen et al. .................... 707/674 |
| 7,966,293 | B1 * | 6/2011 | Owara et al. ................... 707/654 |
| 7,991,748 | B2 * | 8/2011 | Rowan et al. .................. 707/677 |
| 8,005,795 | B2 * | 8/2011 | Galipeau et al. .............. 707/648 |
| 8,010,491 | B2 * | 8/2011 | Edelstein et al. ............. 707/638 |
| 8,108,429 | B2 * | 1/2012 | Sim-Tang et al. ............. 707/790 |
| 2002/0161983 | A1 | 10/2002 | Milos et al. |
| 2003/0163630 | A1 | 8/2003 | Aasheim et al. |
| 2004/0030727 | A1 | 2/2004 | Armangau et al. |
| 2004/0128470 | A1 | 7/2004 | Hetzler et al. |
| 2005/0182910 | A1 * | 8/2005 | Stager et al. .................. 711/162 |
| 2006/0218364 | A1 | 9/2006 | Kitamura |
| 2007/0083567 | A1 * | 4/2007 | Arai et al. ...................... 707/200 |
| 2007/0112894 | A1 * | 5/2007 | Okada et al. ................... 707/204 |
| 2007/0162513 | A1 | 7/2007 | Lewin et al. |
| 2007/0198604 | A1 * | 8/2007 | Okada et al. ................... 707/202 |
| 2007/0276878 | A1 | 11/2007 | Zheng et al. |
| 2008/0027998 | A1 * | 1/2008 | Hara ............................... 707/200 |
| 2008/0071841 | A1 * | 3/2008 | Okada et al. ................... 707/202 |
| 2008/0071842 | A1 * | 3/2008 | Tokuda et al. ................. 707/202 |
| 2008/0091744 | A1 * | 4/2008 | Shitomi et al. ................ 707/204 |
| 2008/0154914 | A1 * | 6/2008 | Kan et al. ......................... 707/10 |
| 2008/0162662 | A1 * | 7/2008 | Fujita et al. .................... 709/214 |
| 2008/0281879 | A1 | 11/2008 | Kawamura |
| 2009/0182959 | A1 | 7/2009 | Rao |
| 2009/0327357 | A1 | 12/2009 | Beglin et al. |

OTHER PUBLICATIONS

U.S. Official Action dated Oct. 8, 2008 in U.S. Appl. No. 11/254,347.
U.S. Notice of Allowance / Allowability dated Jan. 12, 2009 in U.S. Appl. No. 11/254,347.
U.S. Appl. No. 11/254,347, filed Oct. 20, 2005 entitled "Method, System, Apparatus, and Computer-Readable Medium for Provisioning Space in a Data Storage System," Inventors: Chatterjee et al.
U.S. Official Action dated Sep. 4, 2007 in U.S. Appl. No. 11/254,347.
U.S. Official Action dated Mar. 18, 2008 in U.S. Appl. No. 11/254,347.
U.S. Appl. No. 11/255,146, filed Oct. 20, 2005, entitled Method, System, Apparatus, and Computer-Readable Medium for Taking and Managing Snapshots of a Storage Volume,' Inventors: Chatterjee et al.
U.S. Official Action dated Aug. 4, 2006 in U.S. Appl. No. 11/255,146.
U.S. Official Action dated Nov. 17, 2006 in U.S. Appl. No. 11/255,146.
U.S. Official Action dated Aug. 22, 2007 in U.S. Appl. No. 11/255,146.
U.S. Notice of Allowance / Allowability dated Dec. 11, 2007 in U.S. Appl. No. 11/255,146.
U.S. Appl. No. 12/042,705, filed Mar. 5, 2008 entitled "Method, System, Apparatus, and Computer-Readable Medium for Taking and Managing Snapshots of a Storage Volume," Inventors: Chatterjee et al.
U.S. Appl. No. 12/042,710, filed Mar. 5, 2008 entitled "Method, System, Apparatus, and Computer-Readable Medium for Taking and Managing Snapshots of a Storage Volume," Inventors: Chatterjee et al.
U.S. Appl. No. 12/042,715, filed Mar. 5, 2008 entitled "Method, System, Apparatus, and Computer-Readable Medium for Taking and Managing Snapshots of a Storage Volume," Inventors: Chatterjee et al.
Douglis et al., "Log-Structured File Systems," IEEE, 1989, pp. 124-129.
Green et al., "Designing a Fast, On-line Backup System for a Log-Structured File System," Digital Technical Journal, vol. 8, No. 2, 1996, pp. 32-45.
Peterson et al. "Ext3cow: A Time-Shifting File System for Regulatory Compliance," ACM Transactions on Storage, vol. 1, No. 2, May 2005, pp. 190-212.
Rosenblum et al., "The Design and Implementation of a Log-Structured File System," ACM Transactions on Computer Systems, vol. 10, No. 1, Feb. 1992, pp. 26-52.
U.S. Appl. No. 12/013,099, filed Jan. 11, 2008 entitled "Storage System Snapshots for Continuous File Protection," Inventors: Chatterjee et al.
U.S. Appl. No. 12/104,129, filed Apr. 16, 2008 entitled "Low Latency Synchronous Replication Using an N-Way Router," Inventors: Chatterjee et al.
U.S. Appl. No. 12/173,203, filed Jul. 15, 2008 entitled "Data Recovery Point Review in a Continuous Data Protection System," Inventors: Chatterjee et al.
U.S. Official Action dated Jun. 23, 2011 in U.S. Appl. No. 12/472,858.
US 6,988,220, 01/2006, Eng et al. (withdrawn)

* cited by examiner

FIG. 6

CONTINUOUS DATA PROTECTION JOURNALING IN DATA STORAGE SYSTEMS

CROSS-REFERENCE TO RELATED APPLICATIONS

This application claims the benefit of U.S. provisional patent application No. 60/950,651, filed on Jul. 19, 2007, entitled "Protecting Data Continuously in Storage Systems," and U.S. provisional patent application No. 60/950,660, filed on Jul. 19, 2007, entitled "Novel Method of Reviewing Recovery Points in a CDP System," both of which are expressly incorporated herein by reference in their entirety.

BACKGROUND

Data storage and integrity are important components of information age business operations. Enterprises are increasingly moving towards data protection and disaster recovery strategies to prepare for, and recover from, data loss disasters. While some risks to stored data are physical and tangible (for example, failure of a disk drive, fire, or floods), other dangers are intangible or logical (for example, accidental deletion of files, or an attack by a computer virus). Data must be protected from the first category of dangers through physical means, such as remote replication, Redundant Arrays of Inexpensive Disks (RAID), highly-available systems, tape backups, and such.

The second category of inadvertent erasure or modification of data is traditionally mitigated through various approaches. For example, solutions may employ file versioning, tape backups, or periodic backup to a remote server. Many of these solutions are periodic, meaning that they may be executed once a day or even less frequently. As such, when data needs to be recovered, there is a data loss that could be as high as the data created during the time period between two backups.

Requirements to protect against loss of data, along with various regulatory compliance requirements, are driving the move towards solutions involving Continuous Data Protection (CDP). According to the Storage Networking Industry Association's (SNIA) CDP Special Interest Group, CDP is a "methodology that continuously captures or tracks data modifications and stores changes independently of the primary data, enabling recovery points from any point in the past. CDP systems may be block, file or application based and can provide fine granularities of restorable objects to infinitely variable recovery points." Such a definition implies three primary aspects to a CDP implementation. First is the ability to track and capture data. Second is the ability to rollback to any point in the history of the volume. Third is the ability to store captured data in a location external to the main data.

Generally, CDP implementations make use of special dedicated external devices that track and capture history information for every input/output (I/O) operation on a storage node. Data is generally replicated over-the-wire as network traffic to the dedicated CDP devices. These separate devices and the related additional network traffic increases the total cost of ownership (TCO) for the data protection system. Additionally, there is an impact on storage system performance to support CDP.

In typical CDP systems, data within a storage block must be backed up before an I/O write can be performed to that block. As such, each I/O operation can generate three operations within the storage system. That is, one to read the original data, a second to store a backup of the original data, and then a third to write the new data. Traditionally, CDP systems use a dedicated data tap on each host. The data tap duplicates any I/O from the host to provide one copy to the storage volume and another copy to the CDP device. Again, extra system components, and extra sequentially performed storage steps add to the system overhead for implementing CDP.

It is with respect to these considerations and others that the disclosure made herein is presented.

SUMMARY

Technologies are described herein for providing continuous data protection (CDP) of stored computer information. Through the utilization of the technologies and concepts presented herein, data may be continuously protected by a method of block level CDP. The block level CDP may operate without additional external devices and may use a highly efficient, high-performance data capture mechanism. Users may be provided with a flexible mechanism for reviewing and recovering data after a data loss. A user can move to any point in the history of the volume. The data at that point can be reviewed by an operator. If desired, the storage volume can be rolled back to that point nearly instantaneously.

According to one embodiment, all I/O operations to the main storage volume may be logged to a sequential journal volume. This logging can occur in parallel to the I/O operation thereby having little, or no, impact on the performance of the storage system. Previous data need not be backed up; instead only new I/O operations may be recorded in the journal or log.

According to another aspect, snapshot events may also be recorded to the logging journal. When a snapshot of the volume is created, that event may be recorded in the journal along with all I/O operations. When a volume needs to be recovered, a writable snapshot taken prior to the desired recovery point can be mounted. The I/O operations after the creation of that snapshot, but prior to the desired recovery point, can be played back onto the snapshot. Using an efficient snapshot technology, the recovery time from mounting the previous snapshot and playing back the operations from the journal may be extremely fast. Such a system can provide excellent recovery point objective (RPO) performance as well as excellent recovery time objective (RTO) performance. This performance may reduce the cost associated with downtime and can provide considerable improvement over traditional CDP approaches.

Yet another aspect presented herein describes the maintenance of a journaling volume. The journaling volume can be created on an independent RAID array from the main storage volume. This RAID array may be internal to the enclosure of the main storage volume or it may be a separate external RAID enclosure.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing continuous data protection using a journal to log storage operations and snapshot events. Through the use of the embodiments presented herein, continuous data protection may be provided in storage systems using logged write operations to rebuild storage volumes from a storage snapshot created prior to the desired recovery point.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for continuous data protection using storage volume snapshots will be described.

Figure 1:
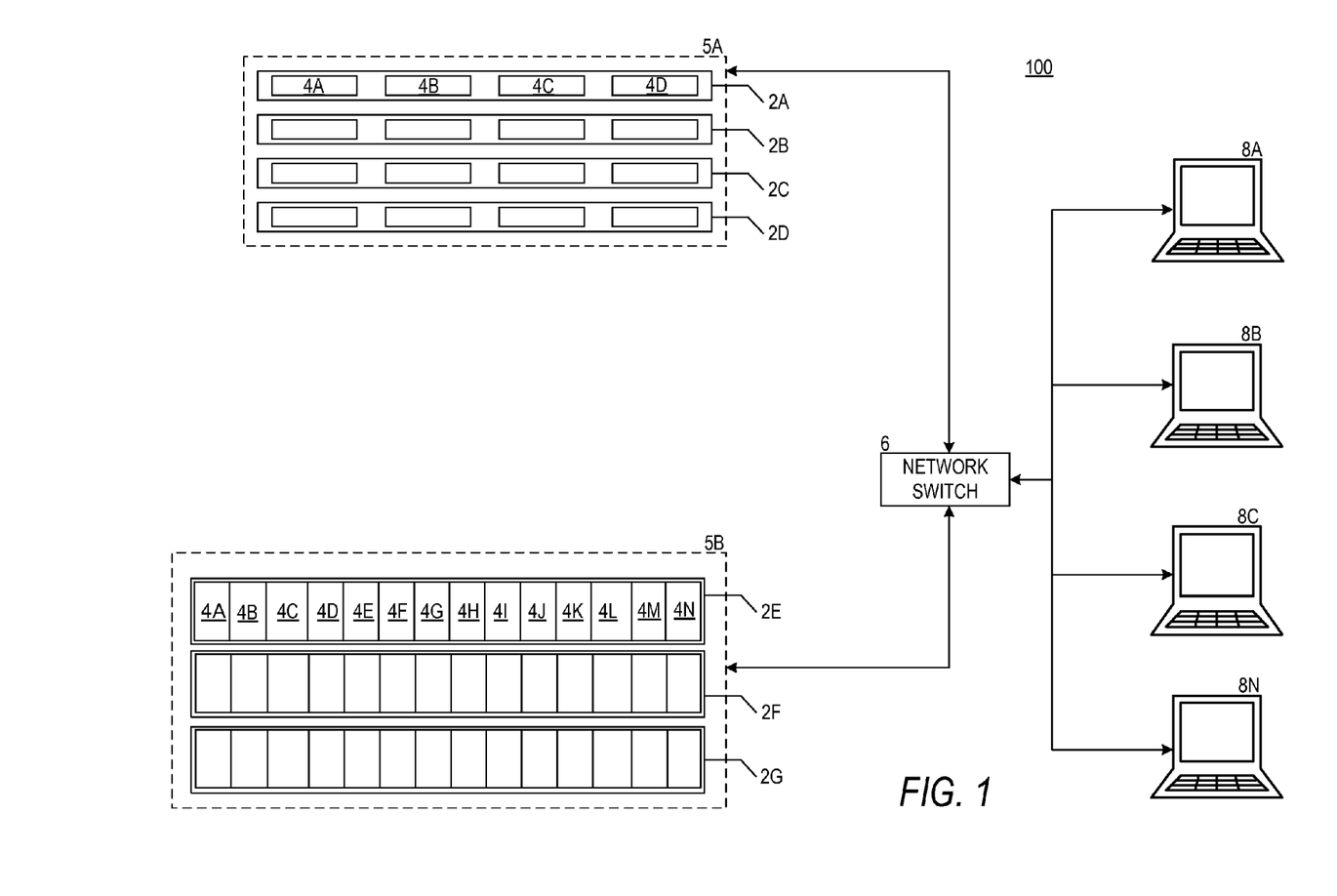
FIG. 1 is a network architecture diagram illustrating aspects of a storage system according to one exemplary embodiment.

Turning now to FIG. 1, details will be provided regarding an illustrative operating environment for the implementations presented herein, as well as aspects of several software components that provide the functionality described herein for continuous data protection. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B include the storage server computers 2A-2G (also referred to herein as "storage nodes" or a "node") that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D. Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Storage volume snapshots and continuous data protection features may be provided on one or more storage server computers 2A-2G, one or more storage clusters 5A-5B, or one or more client computers 8A-8N. Furthermore, the processes for implementing CDP or snapshots for CDP may execute on any of these systems or may operate in a distributed fashion with components executing across two or more of these systems.

Figure 2:
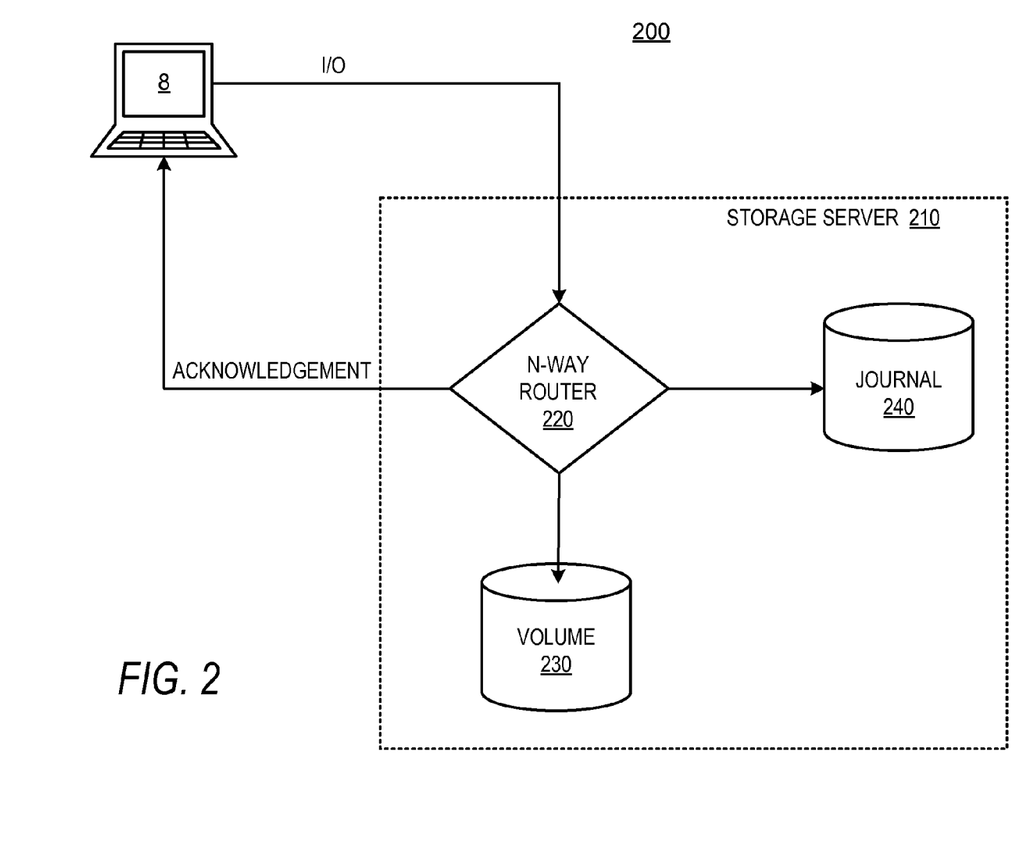
FIG. 2 is a functional block diagram illustrating a storage server with a continuous data protection journal according to one exemplary embodiment.

Referring now to FIG. 2, a functional block diagram illustrates a storage server with a continuous data protection journal according to one exemplary embodiment. An initiator 8 can issue an I/O operation to a storage server 210. An N-way router 220 within the storage server 210 can replicate an I/O write operation. One copy of the I/O write operation can be executed on a storage volume 230 where the data of the write operation can be written. A second copy of the I/O write operation from the N-way router 220 can be logged to a journal 240. An acknowledgement of the I/O operation can be returned from the storage server 210 to the initiator 8. Replicating I/O operations to the journal 240 can be used for CDP. The journal 240 may be considered a "redo log" as it can be used to replay previous storage writes during recover processes as discussed herein.

A write to the main storage volume 230 and the logging write to the journal 240 can be performed in parallel. This can improve performance in contrast to traditional CDP systems where the original I/O must be staged, or delayed, until the history read-write operations are performed. Such traditional staging can delay final acknowledgement to the initiator 8 of the I/O operation.

CDP logging to the journal 240 can take place within the same storage server 210 or on a separate enclosure associated with the storage server 210. The journal 240 may be located on a separate RAID device or storage enclosure from the storage server 210. Separate enclosures can be connected through high bandwidth data interconnects. Any data interconnect technology may be used between the storage components of the system. For example, serial attached SCSI (SAS), fiber channel, 1G Ethernet, 10G Ethernet, USB, firewire, eSATA, or any other data interconnect mechanism may be used. Since I/O operations to the journal 240 may be purely sequential, as opposed to random access, they may be written with increased efficiency. Such efficiency can avoid, or reduce, any impact on application performance associated with providing the CDP functionality.

A traditional CDP implementation generally involves a remote CDP device separate from the main storage server 210. Also, traditional CDP implementations generally involve a host side agent or data tap that duplicates all I/O operations to the separate CDP device. In contrast, a CDP implementation using a logging journal 240 internal to, or attached to, the storage server 210 can avoid the specialized hardware and high-latency, run-time stack of traditional CDP systems thereby reducing costs and improving performance. For example, there may be no need for a data tap at the initiator 8. Instead, an I/O operation may be issued from the initiator 8 to the storage server 210 and then the I/O operation can be replicated by the N-way router 220 within the storage server 210. Integrating the CDP operation at the storage server 210 can also eliminate performance degradation due to replicating data over the network.

In a traditional CDP system, an I/O arrives at a CDP server, it may first have to be staged on to a staging buffer. Next, the previous data for the associated logical block address may have to be read from the image volume and copied on to a historical log, referred to as an undo log. The original I/O can then be executed from the staging buffer and written to the image volume. Only after these sequential tasks can the I/O operation of the traditional approach be completed, or acknowledged, to the initiator 8. In this traditional approach, an I/O operation from the initiator 8 triggers at least three I/O operations involving the undo log and the main data storage. Again, these operations generally occur sequentially. In contrast, a CDP implementation using a logging journal 240 internal to, or attached to, the storage server 210 can perform an I/O operation with two steps that can be completed in parallel resulting in a latency substantially equal to one standard data storage write.

The n-way router 220 can be a programmable I/O routing module. The n-way router 220 can route I/O operations from different incoming sources to different outgoing destinations. The routing can be based on the programming or configuration of the n-way router 220. In the illustrated example, the source to the n-way router 220 is the initiator 8 and the destinations are the journal 240 and the storage volume 230. The n-way router 220 can operate to duplicate incoming I/O operations to the two destinations. The n-way router 220 may also assist in routing the I/O acknowledgement from the storage server 210 back to the initiator 8. The acknowledgement may also come directly from the storage server 210 without passing through the n-way router 220.

Figure 3:
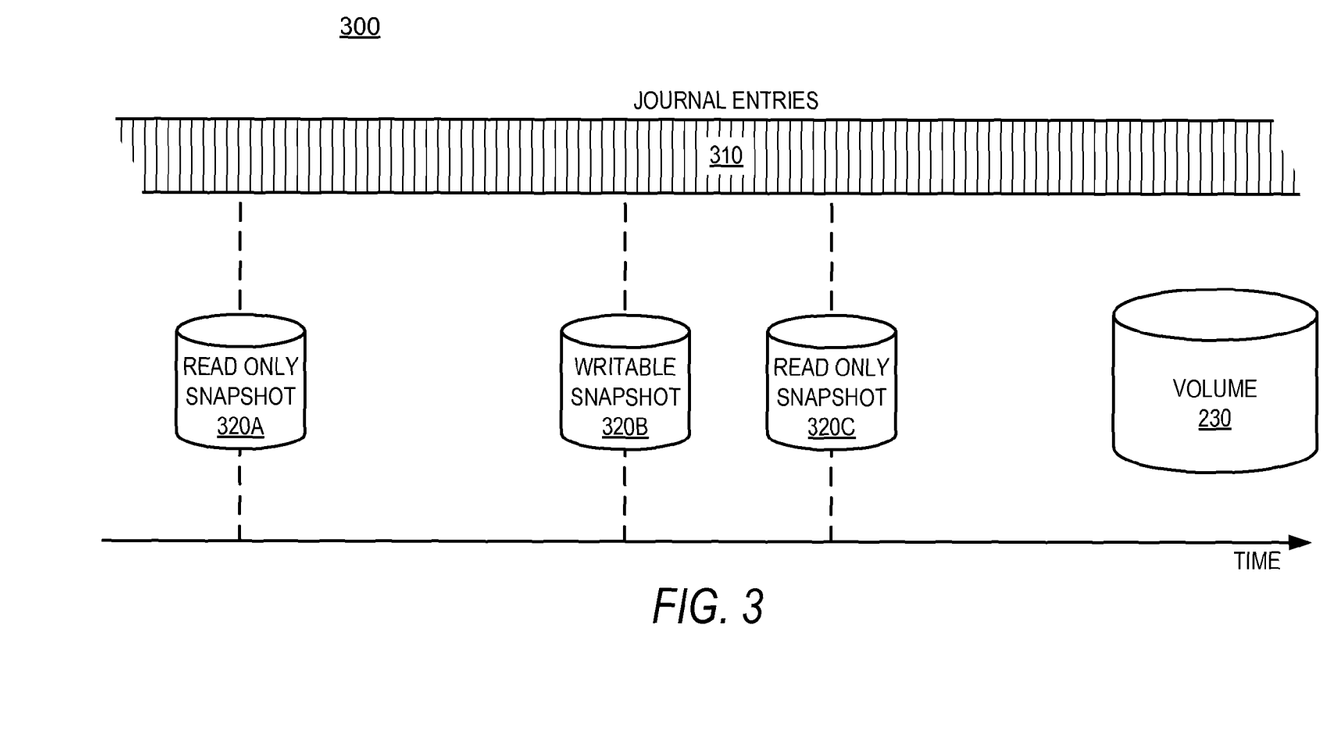
FIG. 3 is a timeline illustrating journal entries of storage operations and snapshot events according to one exemplary embodiment.

Referring now to FIG. 3, a timeline 300 illustrates journal entries 310 of storage operations and snapshot events according to one exemplary embodiment. In addition to logging I/O operations into the journal 240, snapshot events 320A-320C and application-specific events may also be logged. The inclusion of snapshot events in the journal 240 can simplify and significantly accelerate the loss recovery process for a CDP system.

Snapshots may be taken of a data storage volume using an efficient technique that requires little, or no, performance overhead. The snapshot technique may also support quickly rolling a volume 230 back to an earlier snapshot, and the creation of writable snapshots. The volume 230 can be the most recent, and currently operational, version of the data store. In the snapshot system, a linked list can be maintained for each logical unit of allocation in a data storage volume. Such an allocation unit of the storage system may be referred to as a provision. The linked list can contain nodes, each of which can correspond to a particular snapshot lifetime in which the provision was written. A snapshot lifetime can be equated to the period of time that a particular snapshot is active. Each snapshot lifetime may be uniquely associated with an increasing sequence number that identifies the snapshot lifetime. Each node in the linked list can include a data field for storing the sequence number for the provision, a pointer to the next node in the linked list, and a bitmap for storing data identifying each of the sub-portions, or chunks, of the provision that were written to during the snapshot lifetime of the provision. The bitmap is utilized for a variety of purposes, including determining the particular provision that should be utilized to fetch data for a read request. Deleting a snapshot and rolling back a volume 230 to a previous snapshot may be accomplished by quickly manipulating the contents of the linked list.

The linked list data structure can support read-only snapshots 320A, 320C and can also support the ability to create writable snapshots 320B. A new node can be added to the linked list whenever a write request is received for the corresponding logical provision for the first time during a given snapshot lifetime. When a request is received to read from a logical provision, the linked list can be traversed to locate the node in the list having the highest sequence number and also having valid data for the requested portion of the provision. This process can identify the latest version of that provision. Valid data can be indicated by the contents of the bitmap. Once the appropriate node has been located, the data can be read from the physical location corresponding to the located node of the linked list.

At recovery time, an operator can examine the journal using a visual recovery tool. The operator can examine optimal points of recovery, and review them for authenticity and data integrity. These operations can assist the operator in determining the point in history to roll the volume 230 back to. Once the operator chooses a recovery point, the snapshot prior to the recovery point can be mounted in a read/write mode as a writable snapshot. Since the snapshot and the subsequent I/O operations are all captured as journal entries 310 in the redo log, the review action may be performed by reading the data from the redo log and applying it on to the writable snapshot. Once the operator is satisfied with the recovery point, the operator can roll back the volume 230 to the writable snapshot. The roll back can be performed very quickly using the snapshot system of provisions in linked list. This efficiency can significantly reduce the RTO of the CDP system.

For the operator to examine the journal and determine a recovery point within a traditional CDP implementation the undo log is generally read in reverse order and the old data is explicitly copied onto an image volume. A complication in this traditional CDP scenario occurs at roll back. The data from the CDP server may need to be applied to the original volume in the storage server before applications can be restarted. Since terabytes of data may be stored in the volume, the traditional CDP roll backs can take hours and even multiple days. Such RTO performance may be unacceptable in many production enterprise systems.

Typical storage servers with application-aware snapshots can provide application-consistent recovery points for a data volume. However, these recovery points may be widely interspersed. In a journaling CDP system, application-specific checkpoints can be captured among the journal entries 310 using special application-specific functions. These application-specific event points can be displayed on a recovery time-line to an operator at roll back time. Such application-specific roll back visibility can support application event context for improved recoverability performance.

If the operator of the CDP system is not satisfied with a recovery point, they may want to move forward in the time-line to reduce the RPO. A flexible review option can be supported. For example, if the operator is not satisfied with the recovery point, they can move forward or backward quite easily.

Review may be done in the forward direction, by reading the redo log from a journal and playing it onto a writeable snapshot of a volume. The snapshot chosen may be the one closest in time, just before the desired recovery point. The journal can also have an indicator of the snapshot in the same chronological order. Logs can be read from the journal just after the snapshot point to be played into the writeable snapshot. This can proceed up to the point where the operator has requested review. At the end of such a redo log play back operation, the writeable snapshot may be an exact copy of the original volume at the point in time expected by the operator. This redo log playback can be controlled up to a single I/O granularity. During a forward review, the redo logs read from the journal may also be maintained in memory. This can provide a chronological order of I/O operations that occurred on the volume after the snapshot.

For a backward review, logs can be undone from the writeable snapshot by referencing the logs in memory and then overwriting the dirty writes with original data from the read-only snapshot and the log. The method of reading and writing the logs can be done in parallel, thereby reducing the time taken for presenting a review image. Finally, the recovery can be committed by rolling back the reviewed image onto the volume. This can be done by rolling back the writeable snapshot onto the volume, which in the snapshot system discussed above can be done in a substantially reduced amount of time.

Figure 4:
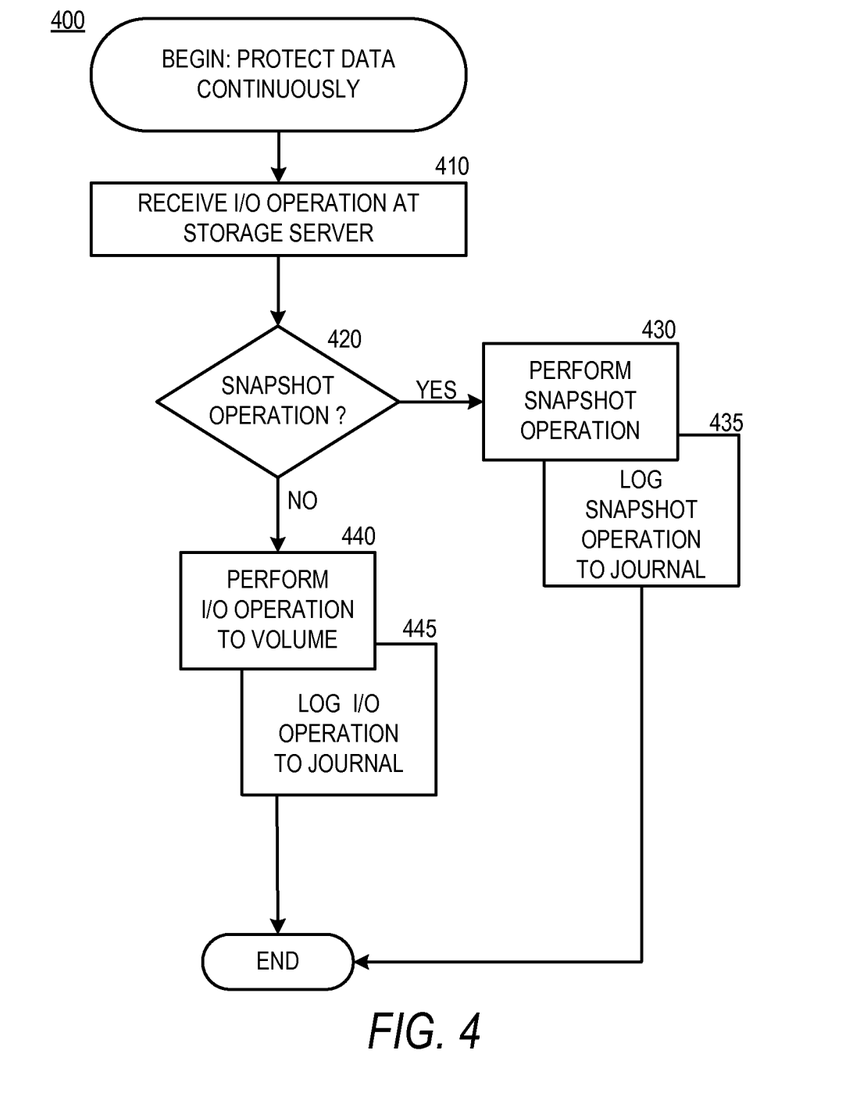
FIG. 4 is a logical flow diagram illustrating a process for protecting data continuously according to one exemplary embodiment.

Turning now to FIG. 4, additional details will be provided regarding the embodiments presented herein for continuous data protection. In particular, FIG. 4 is a flow diagram showing a routine 400 that illustrates aspects of a process for protecting data continuously according to one exemplary embodiment. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 400 can begin with operation 410 where an I/O operation can be received from an initiator 8 into a storage server 210. At operation 420, it can be determined if the operation is related to a snapshot event. For example, a snapshot creation, deletion, rollback, or any other type of snapshot event. If a snapshot event is occurring, the routine 400 can continue to operation 430. At operation 430, the snapshot operation can be carried out. In parallel to operation 430, operation 435 can log the snapshot operation into the journal 240. After the parallel operations 430 and 435, the routine 400 can terminate.

If instead, it is determined at operation 420 that a snapshot event is not occurring, the routine 400 can continue to operation 440 where a normal, non-snapshot, I/O operation can be performed. At operation 440, the operation received at operation 410 can be executed against the main storage volume 230. In parallel to operation 440, operation 445 can log the I/O operation to the journal 240. Since the journal logging can occur in parallel to the performance of the actual I/O operation, additional overhead due to CDP activities can be substantially avoided. After the parallel operations 440 and 445, the routine 400 can terminate.

Figure 5:
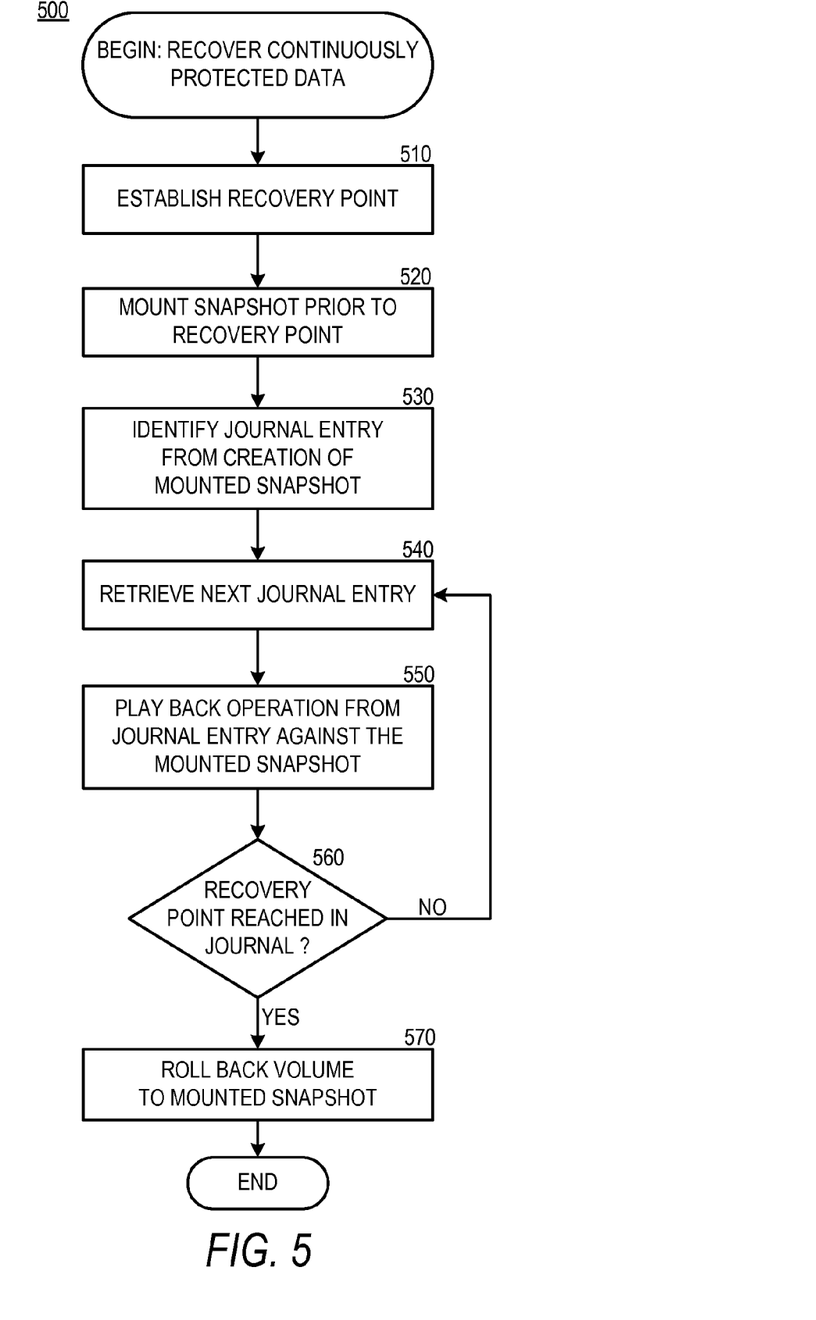
FIG. 5 is a logical flow diagram illustrating a process for recovering continuously protected data according to one exemplary embodiment.

Turning now to FIG. 5, additional details will be provided regarding the embodiments presented herein for continuous data protection. In particular, FIG. 5 is a flow diagram illustrating a routine 500 that shows aspects of a process for recovering continuously protected data according to one exemplary embodiment. The routine 500 can begin with operation 510 where a recovery point can be established. The recovery point can be established based on an event, a time/date stamp, or an application specific event. The recovery point can be established using a graphical recovery tool providing a visual indication of possible recovery points. The recovery tool can support rolling backward and forward as discussed above.

At operation 520, the last snapshot prior to the desired recovery point can be identified and mounted. The prior snapshot can be identified by searching backwards through the log journal 240 from the desired recovery point until a snapshot creation event is reached. The snapshot created by the logged snapshot creation event can be mounted. At operation 530, the journal entry 310 is identified that recorded the creation of the snapshot that was mounted in operation 520. The journal entries 310 in the logging journal 240 between this snapshot event journal entry 310 and the desired recover point may be used to restore, or redo, the mounted snapshot up to the desired recovery point.

At operation 540 the next journal entry 310 from the identified point can be retrieved. At operation 550, the I/O operation recorded in the next journal entry 310 retrieved at operation 540 can be played back from the journal 240 onto the mounted snapshot. At operation 560, it is determined if the next journal entry 310 has reached the desired recovery point within the journal 240. If the desired recovery point has not yet been reached, the routine 500 can loop back to operation 540 where the next journal entry 310 can be retrieved for playback. If instead, it is determined at operation 560 that the desired recovery point has been reached, the routine 500 can continue to operation 570.

At operation 570, the current volume 230 can be rolled back to the mounted snapshot that has been rebuilt up to the desired recovery point by the iterative application of operations 540, 550, and 560. After operation 570, the routine 500 can terminate.

Figure 6:
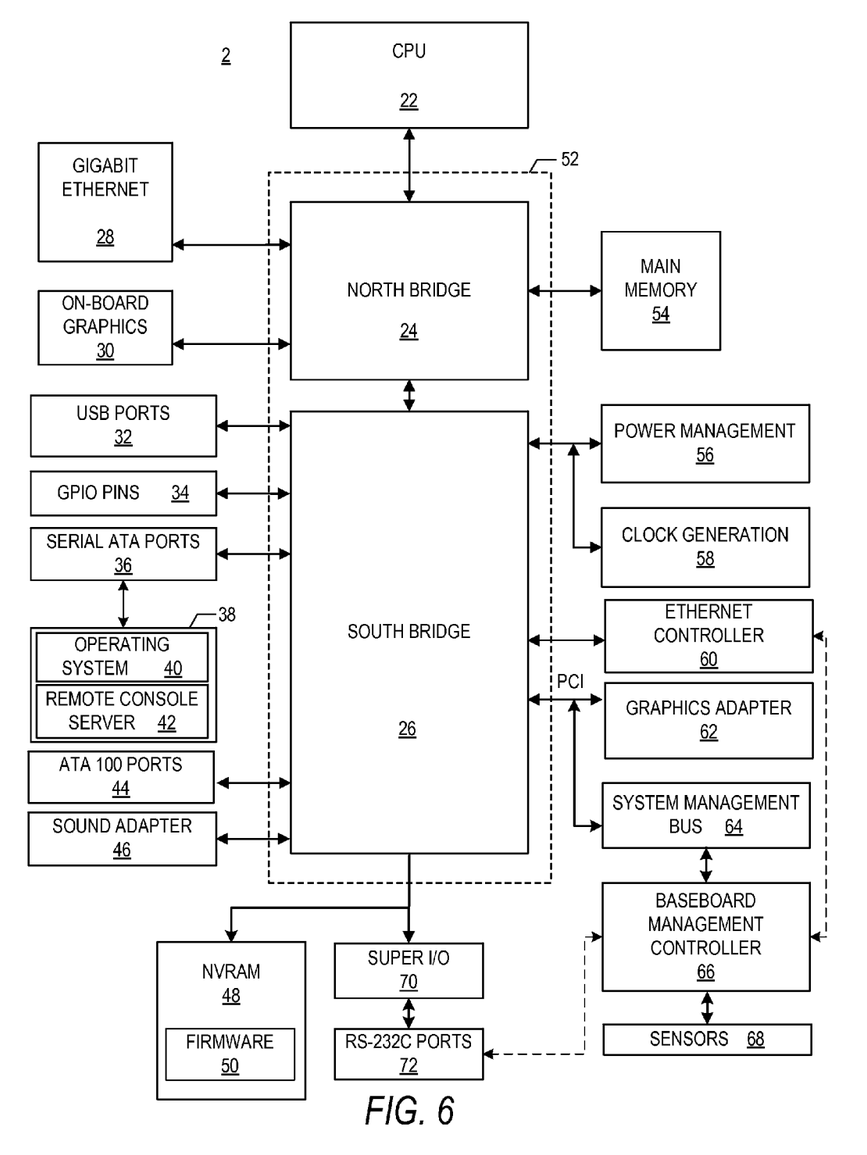
FIG. 6 is a computer architecture diagram illustrating a computer hardware architecture for a computing system capable of continuous data protection according to one exemplary embodiment.

FIG. 6 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 6 shows an illustrative computer architecture for a storage server computer 2 that may be utilized in the implementations described herein. Such an illustrative computer system may also describe a client computer system 8A-8N. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 6, may include other components that are not explicitly shown in FIG. 6, or may utilize an architecture completely different than that shown in FIG. 6.

Based on the foregoing, it should be appreciated that technologies for continuous data protection with journal logging for I/O operations and snapshot events are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing continuous data protection, the method comprising:
   receiving a data write operation at a storage server;
   replicating the data write operation at the storage server into a first copy and a second copy;
   executing the first copy on a storage volume associated with the storage server and storing data associated with the data write to the storage volume;
   recording the second copy to a journal in parallel with executing the first copy on the storage volume and storing data associated with the data write to the storage volume;
   adding a new node to a snapshot linked list when the data write operation is received at the storage server during a given snapshot lifetime;
   determining a desired recovery point;
   identifying the recovery point within the journal; and
   playing the journal back to apply recorded operations up to the determined recovery point.

2. The method of claim 1, wherein the journal is co-located with the storage server.

3. The method of claim 1, further comprising storing snapshot events to the journal.

4. The method of claim 3, further comprising identifying a snapshot creation event prior to the desired recovery point.

5. The method of claim 4, wherein playing the journal back to apply recorded operations begins at the identified snapshot creation event.

6. The method of claim 1, further comprising rolling back recovered data to the storage volume.

7. The method of claim 1, further comprising storing application-specific events to the journal.

8. A non-transitory computer storage medium having computer-executable instructions stored thereon which, when executed by a computer system, cause the computer system to:
- receive a data write operation at a storage server;
- replicate the data write operation at the storage server into a first copy and a second copy;
- execute the first copy on a storage volume associated with the storage server and store data associated with the data write to the storage volume;
- record the second copy to an operation log local to the storage server in parallel with executing the first copy on the storage volume and storing data associated with the data write to the storage volume;
- add a new node to a snapshot linked list when the data write operation is received at the storage server during a given snapshot lifetime; and
- support rapid data recovery operations.

9. The non-transitory computer storage medium of claim 8, wherein supporting rapid data
- recovery operations comprises determining a desired recovery point, identifying the recovery point within the operation log, and playing the operation log back to apply recorded operations up to the determined recovery point.

10. The non-transitory computer storage medium of claim 9, further comprising causing the
- computer system to store snapshot events to the operation log.

11. The non-transitory computer storage medium of claim 10, further comprising causing
- the computer system to identify a snapshot creation event prior to the desired recovery point.

12. The non-transitory computer storage medium of claim 11, wherein playing the operation
- log back to apply recorded operations begins at the identified snapshot creation event.

13. The non-transitory computer storage medium of claim 8, further comprising rolling back
- recovered data to the storage volume.

14. The non-transitory computer storage medium of claim 8, further comprising storing
- application-specific events to the operation log.

15. A continuous data protection system comprising:
- a storage server;
- a storage volume associated with storage server;
- a journal associated with the storage server;
- a processing unit associated with the storage server;
- and a memory having one or more modules that, when executed by the processing unit, cause the storage server to
- receive a data write operation at the storage server, replicate the data write operation at the storage server into a first copy and a second copy,
- execute the first copy on the storage volume and store data associated with the data write to the storage volume, record the second copy to the journal in parallel with executing the first copy on the storage volume and storing data associated with the data write to the storage volume, and add a new node to a snapshot linked list when the data write operation is received at the storage server during a given snapshot lifetime.

16. The system of claim 15, the one or more modules for execution on the processing unit, further operable to determine a desired recovery point, identify the recovery point within the journal, and playing the journal back to apply recorded operations up to the determined recovery point.

17. The system of claim 16, the one or more modules for execution on the processing unit, further operable to store snapshot events to the journal and identify a snapshot creation event prior to the desired recovery point.

18. The system of claim 17, wherein playing the journal back to apply recorded operations begins at the identified snapshot creation event.

19. The system of claim 16, the one or more modules for execution on the processing unit, further operable to roll back recovered data to the storage volume.

20. The system of claim 15, the one or more modules for execution on the processing unit, further operable to store application-specific events to the operation log.

* * * * *